United States Patent Office 3,452,094
Patented June 24, 1969

3,452,094
N-2-PHENYL-2-(2-HYDROXY-1-NAPHTHYL)
ETHYL-N-SUBSTITUTED AMINES AND SALTS
THEREOF
Ralph D. Tanz, North White Plains, N.Y., assignor to Geigy Chemical Corporation, Ardsley, N.Y., a corporation of New York
No Drawing. Continuation-in-part of application Ser. No. 398,790, Sept. 23, 1964. This application July 19, 1967, Ser. No. 654,392
Int. Cl. C07c 87/28; A61k 27/00
U.S. Cl. 260—570                                27 Claims

ABSTRACT OF THE DISCLOSURE

N-2-phenyl-2-(2-hydroxy-1-naphthyl)ethyl-N-substituted amines and their salts, are antiarrhythmic agents. A typical embodiment is N-2-(4-hydroxyethyl)-2-(2-hydroxy-1-naphthyl)ethyl-N-2-isopropylamine and its hydrochloric salt.

CROSS-REFERENCE

This is a continuation-in-part of Ser. No. 398,790, filed Sept. 23, 1964, now abandoned.

DETAILED DESCRIPTION

This invention relates to novel organic compounds having pharmacological properties. In particular, the present invention pertains to compounds of the formula:

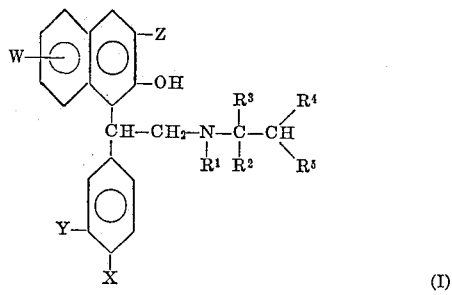

(I)

wherein each of X and Y is hydrogen, hydroxy, methoxy, chloro or fluoro;
W is hydrogen, chloro, fluoro, bromo or hydroxy;
Z is hydrogen, hydroxy or hydroxymethyl;
$R^1$ is hydrogen or (lower)alkyl;
each of $R^2$, $R^3$ and $R^4$, independent of the other, is hydrogen, methyl or ethyl; and
$R^5$ is hydrogen, methyl, ethyl, phenyl or hydroxyphenyl.

Compounds of the above structure demonstrate the ability to normalize variations in rhythm of the heartbeat and are thus useful in the treatment of various arrhythmic conditions. In addition, these compounds demonstrate local anesthetic properties, hypotensive and antihypertensive activity. These compounds are particularly useful in the treatment of primary arrhythmias, both those which are drug induced, as for example by reason of an overdose of adrenalin or cardiac glycosides such as digitalis or ouabain, and those inherent in certain cardiac diseases. These compounds may be administered via the usual known routes such os orally or parenterally in any of the usual pharmaceutical forms such as tablets, suspensions, solutions, capsules or the like. Although the dose should, in every case, be individualized, in view of the species, age, weight and the particular arrhythmic condition of the subject, starting administration at a low dosage level and increasing the dosage until the desired effect is obtained, the range of suitable levels extends from about 0.5 mg./kg. to about 20 mg./kg., e.g., from about 3 mg./kg. to about 10 mg./kg.

The compounds of the present invention are incorporated in compositions suitable for oral administration to animals in solid and liquid unit dosage forms, such as tablets, capsules, powders, granules, syrups, elixirs, and the like. The term unit dosage form as used in this specification and claims refers to physically discrete units suitable as unitary dosages for animals, each unit containing a predetermined quantity of active material calculated to produce the desired therapeutic effect in association with the required pharmaceutical diluent, carrier or vehicle.

Powders are prepared by comminuting a compound of this invention to a suitably fine size and mixing with a similarly comminuted diluent. The diluent can be an edible carbohydrate material such as starch. A sweetening agent or sugar may also be present as well as flavoring oil.

Granules for reconstitution into a liquid oral preparation are prepared utilizing water-soluble diluents. A powder mixture of the finely divided compound and a water-soluble diluent such as sucrose, glucose, and the like, is wetted with a binder such as acacia mucilage, gelatin solution, methyl cellulose solution and forced through a screen to form granules which are allowed to dry. A suspending agent such as tragacanth may be included in the composition.

Capsules are made by preparing a powder mixture as described above and filling formed gelatin sheaths. As an adjuvant to the filling operation, a lubricant such as talc, magnesium stearate and calcium stearate may be added to the powder mixture before the filling operation.

Tablets are made by preparing a powder mixture, granulating or slugging, adding a lubricant and pressing into tablets. The powder mixture is prepared by mixing the compound, suitably comminuted, with a diluent or base such as starch, sucrose, kaolin, dicalcium phosphate and the like. The powder mixture can be granulated by wetting with a binder such as syrup, starch paste or acacia mucilage and forcing through a screen. As an alternative to granulating, the powder mixture can be slugged, i.e., run through the tablet machine and the resulting imperfectly formed tablets broken into pieces (slugs). The slugs can be lubricated to prevent sticking to the tablet forming dies by means of the addition of stearic acid, a stearate salt, talc or mineral oil. The lubricating mixture is then compressed into tablets. A protective coating is consisting of a sealing coat of shellac, a coating of sugar and methyl cellulose, and a polish coating of carnauba wax may be provided.

Oral fluids are prepared in unit dosage forms such as syrups and elixirs wherein each teaspoonful of composition contains a predetermined amount of the compound for administration.

A syrup is prepared by suspending the compound in a suitably flavored aqueous sucrose solution. Similarly, an elixir is prepared utilizing a nontoxic alcohol vehicle.

For parenteral administration, aqueous and oleaginous fluid unit dosage forms can be prepared. In preparing the parenteral form, a measured amount of the compound is placed in a vial, the vial and its contents sterilized and sealed. An accompanying vial of sterile water may be provided as a vehicle to form a suspension prior to administration.

As examples of the in vivo properties of these compounds,

N-2-(4-hydroxyphenyl)-2-(2-hydroxy-1-naphthyl)
   ethyl-N-isopropylamine,
N-2-(4-chlorophenyl)-2-(2-hydroxy-1-naphthyl)ethyl-
   N-isopropylamine, N-2-(4-methoxyphenyl)-2-(2-hydroxy-1-naphthyl)ethyl-N-isopropylamine, N-2-(4-hydroxyphenyl)-2-(2-hydroxy-1-naphthyl)ethyl N-tert-butylamine, all as the hydrochloride salts, demonstrate the ability to decrease blood pressure and the rate and contractile force of the heartbeat. These compounds also demonstrate the ability to return the heartbeat to a sinus rhythm in subjects having tachycardia, such as ventricular tachycardia induced by cardiac glycosides, whether the antiarrhythmic compounds are administered intravenously or via the gastrointestinal tract. Activity is also observed in in vitro models via measurement of the minimal frequency refractory period in the electrically stimulated ventricular papillary muscle preparation.

A particularly valuable embodiment embraced within the present invention is the pharmaceutically acceptable nontoxic acid addition salts of the above amines. These salts include those derived from both organic and inorganic acids such as for example, hydrochloric, hydrobromic, sulfuric, phosphoric, methanesulfonic, acetic, lactic, succinic, malic, aconitic, phthalic, tartaric and like acids. It is to be understood that while a salt form, as for example the hydrochloride, is often more convenient than the corresponding free amine for the purpose of formulation and stability of dosage units, the antiarrhythmic properties of the salts are a function of the amine forming the cation thereof.

The compounds of the present invention exist as optical isomers and both the racemate of these isomers and the individual isomers themselves are within the scope of the present invention. The racemate may be separated into its individual isomers through the well-known technique of formation of disastereoisomeric salts with optically active acids, such as d- or l-tartaric acid. Both similarities and distinctions in properties are observed with the resolved enantiomorphs. Thus for example each of the d- and l-isomers of N-2-(4-hydroxyphenyl)-2-(2-hydroxy-1-naphthyl)ethyl-N-isopropylamine, as the hydrochloride salt, decreases blood pressure. While the l-isomer also decreases heart rate in cats, the d-isomer does not, nor does the d-isomer decrease the contractile force of the heartbeat in the same animal. The d-isomer does however reverse ouabain-induced ventriculartachycardia and shows excellent activity in reduction of the minimal frequency refractory period.

A preferred group of compounds of the present invention are those represented by the formula:

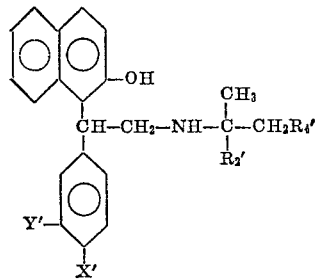

Ia wherein

X' is hydrogen, hydroxy, methoxy or chloro,

Y' is hydrogen or chloro, and each of $R_2'$ and $R_4'$ is hydrogen or methyl, and the acid addition salts thereof. Of the above compounds of Formula Ia, those wherein both $R_2'$ and $R_4'$ are hydrogen are considered preferred.

The compounds of the present invention are prepared in a first embodiment by condensation of a β-naphthol of Formula II with the appropriately substituted β-phenylethanolamine in the presence of a strong mineral acid. The primary amine thus obtained is then treated with ketone or aldehyde and the Schiff base thus obtained is catalytically hydrogenated, as for example, with palladium-on-carbon. These reactions may be represented as follows:

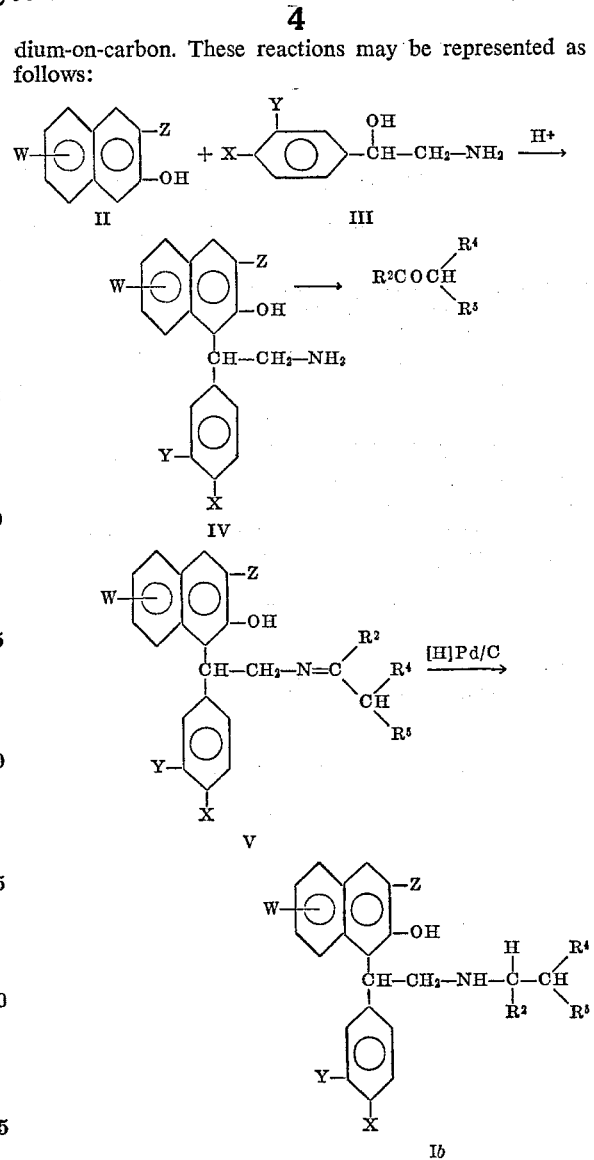

In practice, the Schiff base (V) need not be isolated but may be directly reduced to the desired secondary amine.

In a second embodiment of this invention, an N-alkylated β-phenylethanolamine of Formula VI is condensed with a β-naphthol of Formula II in the presence of an acid catalyst. Generally when either X or Y is hydroxy, the hydroxy group is first acylated. Such an acyloxy group is however hydrolysed in the course of the reaction, thereby regenerating the hydroxy group. This reaction may be represented as follows:

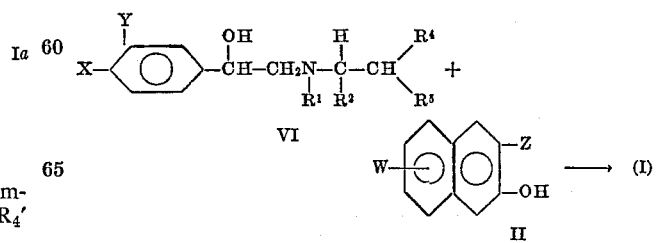

The requisite β-phenylethanolamine of Formula VI may be obtained, for example via initial condensation of a benzaldehyde and nitromethane under basic conditions, followed by catalytic hydrogenation, as with a palladium-on-carbon catalyst, of the resulting α-hydroxy-β-nitroethylbenzene in the presence of an alkyl ketone or aldehyde.

As a third method of preparing the compounds of the present invention, an N-alkylated 2-(2-hydroxyl-1-naphthyl)-2-phenylacetamide of Formula VII is reduced, as for example with borane, lithium aluminum hydride or the like, generally in an anhydrous ether solvent such as tetrahydrofuran, diethyl ether or the like. This reaction may be represented as follows:

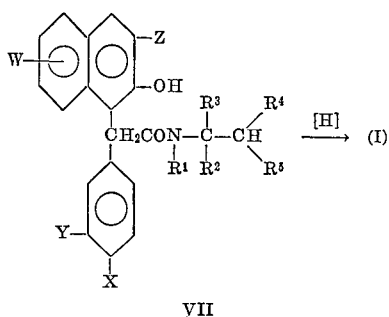

VII

The substituted acetamides of Formula VII may be prepared by condensation of a β-naphthol of Formula II with mandelic acid, an ester thereof or substituted derivatives of either. When a mandelate is utilized, an acid catalyst is advantageously employed. The product of this reaction is a lactone, specifically a 1-phenyl-2-oxo-1,2-dihydronaphtho[2,1-b]furan. This is subected to treatment with an excess of the appropriate primary or secondary amine, thereby effecting ring opening of the lactone with concurrent amidation.

The following examples will serve to further typify the nature of this invention but should not be construed as a limitation thereof.

EXAMPLE 1

N-2-(4-hydroxyphenyl)-2-(2-hydroxy-1-naphthyl) ethyl-N-isopropylamine (a) To 1.53 g. of α-aminomethyl-4-hydroxybenzyl alcohol are added 4.38 g. of β-naphthol and 5 ml. of 2 N hydrochloric acid. The mixture is heated for 2 hours at 100° C. and then diluted with water and extracted three times with 100 ml. portions of ether. The combined extracts are evaporated to dryness under reduced pressure. The residue is triturated with absolute ethyl ether and the solid which forms is collected by filtration and recrystallized from ethanol to yield 2-(4-hydroxyphenyl)-2-(2-hydroxy-1-naphthyl)ethylamine as the hydrochloride. The free amine may be obtained from an aqueous solution of the hydrochloride salt through addition of dilute aqueous ammonia.

To a solution of 0.8 ml. of acetone and 2.79 g. of 2-(4-hydroxyphenyl)-2 - (2 - hydroxy-1-naphthyl)ethyl-amine hydrochloride in 50 ml. of ethanol is added a trace of concentrated hydrochloric acid. This mixture is then refluxed for one hour and allowed to cool. There is then added an additional 0.25 ml. of hydrochloric acid and the reaction mixture then hydrogenated over palladium-on-carbon at 20 atmospheres pressure until .01 mole of hydrogen have been absorbed. The reaction mixture is filtered, the catalyst removed and absolute ether added to the filtrate. The solid thus formed is collected by filtration and dried over phosphorus pentoxide at 100°/2 mm. to yield N-2-(4-hydroxyphenyl)-2-(2-hydroxy-1-naphthyl)ethyl - N - isopropylamine hydrochloride, alternatively named as 2-[β-(2-hydroxynaphthyl-1)-β-(4-hydroxyphenyl)-ethylamino]propane hydrochloride. The free amine is obtained from an aqueous solution of the hydrochloride salt through addition of dilute aqueous ammonia, collection of the solid and drying over phosphorous pentoxide at 100°/2 mm.

N-2-(4-hydroxyphenyl) - 2 - (2-hydroxy - 1 - naphthyl) ethyl-N-isopropylamine, as its hydrochloride salt, is a white crystalline material having a melting point of 246° C., with decomposition.

(b) Alternatively this compound is prepared via the following procedure:

A mixture of 25 g. of ethyl p-methoxymandelate, 34.3 g. of β-naphthol and 1.5 g. of p-toluene sulfonic acid is heated at 180° for 75 minutes and then at 200° for 45 minutes. The cooled mass is crushed under 25 ml. of ethanol and the insoluble portion is collected and was washed with a little chilled ethanol. Recrystallization from dilute acetic acid yields 1-(p-methoxyphenyl)-2-oxo-1,2-dihydronaphtho[2,1-b]furan as white crystals, M.P. 146.5–147.5° C.

A mixture of 25.7 g. of 1-(p-methoxyphenyl)-2-oxo-1,2-dihydronaphtho[2,1-b]furan, 274 ml. of glacial acetic acid, and 103 ml. of 48% aqueous hydrogen bromide is refluxed for four hours. After storage at 0° for overnight, the precipitate is collected and washed with a little dilute ethanol, to yield 1-(p-hydroxyphenyl)-2-oxo-1,2-dihydronaphtho[2,1-b]furan, as off-white crystals, M.P. 220–221° C.

A solution of 47.6 g. of 1-(p-hydroxyphenyl)-2-oxo-1,2-dihydronaphtho[2,1-b]furan in 350 ml. of isopropyl amine is refluxed for 2.75 hours. Excess amine is removed by distillation, the last traces under reduced pressure. The oily residue is dissolved in 1 liter of ethyl acetate and this solution is washed twice with 200 ml. portions of 3 N aqueous hydrochloric acid and then once with 200 ml. of water. The solution is dried over sodium sulfate and concentrated under reduced pressure. The oily residue is dissolved in benzene and upon standing, the solution deposits off-white crystals of N-isopropyl 2-(2-hydroxy-1-naphthyl)-2-(4-hydroxyphenyl) acetamide, M.P. 178° C. (dec.).

A solution of 51.4 g. N-isopropyl 2-(2-hydroxy-1-naphthyl)-2-(4-hydroxyphenyl)acetamide in 500 ml. of tetrahydrofuran (500 ml.) is added dropwise to 462 ml. of a 1 M solution of borane in tetrahydrofuran maintained at 0° under nitrogen. After addition is complete, the reaction mixture is refluxed for 4 hours, the cooled reaction mixture is rendered acidic by careful addition of 1800 ml. of 3 N aqueous hydrochloric acid and the tetrahydrofuran is removed by distillation. The solid which separates from the aqueous phase is collected and recrystallized from ethanol/ether to yield N-2-(4-hydroxyphenyl)-2-(2-hydroxy-1-naphthyl)ethyl-N-isopropylamine hydrochloride. Treatment with aqueous sodium hydroxide yields the free base, M.P. 162.5° C.

(c) Resolution may be effected by treatment of 22.1 g. of the d,l-free base with 10.4 g. of l-tartaric acid in 1000 ml. of methanol with stirring at room temperature until a solution is obtained. The solution is filtered and concentrated to yield d,l-N-2-(4-hydroxyphenyl)-2-(2-hydroxy-1 - naphthyl)ethyl - N - isopropylamine l - tartrate, $[\alpha]_D = -8.9°$ (c.=0.990, methanol). This salt (35.4 g.) is extracted with acetone in a hot extractor, the extracts are in turn filtered hot and the filtrate retained. The solid collected upon filtration is recrystallized twice as described from acetone to yield d-N-2-(4-hydroxyphenyl)-2-(2-hydroxy-1-naphthyl)ethyl - N - isopropylamine l-tartrate, M.P. 180° C. (dec.), $[\alpha]_D = +60.3°$ (c.=1.044, methanol). A suspension of this tartrate in water is adjusted to pH 4.5 with aqueous sodium hydroxide and then rendered strongly acidic with hydrochloric acid. The solid which forms is collected and recrystallized from ethanol/ether to yield d-N-2-(4-hydroxyphenyl)-2-(2-hydroxy - 1 - naphthyl)ethyl-N-isopropylamine hydrochloride, M.P. 249° C., $[\alpha]_D = +52.2°$ (c.=1.045, methanol).

The filtrate obtained from the above recrystallizations, containing a predominant amount of 1-N-2-(4-hydroxyphenyl) - 2 - (2 - hydroxy-1-naphthyl)ethyl-N-isopropylamine l-tartrate, is converted to the free base with aqueous sodium hydroxide. This free base is then subjected to the resolution procedure immediately described above, employing however d-tartaric acid in place of l-tartaric acid. The l-N-2-(4-hydroxyphenyl) - 2 - (2 - hydroxy-1-naphthyl)ethyl-N-isopropylamine d-tartrate, $[\alpha]_D = 60.7°$ (c.=0.961, methanol)

which is obtained upon hot filtration of the acetone extracts, is treated with aqueous sodium hydroxide and then hydrochloric acid as previously described to yield l-N-2-(4-hydroxyphenyl) - 2 - (2 - hydroxy-1-naphthyl)ethyl-N-isopropylamine hydrochloride as cream colored platelets, M.P. 250° C., $[\alpha]_D = -53.9°$ (c.=1.100, methanol).

EXAMPLE 2

N-2-(3,4 - dihydroxyphenyl)-2-(2-hydroxy-1-naphthyl) ethyl-N-isopropylamine

By employing 1.69 g. of α-aminomethyl-2,3-dihydroxybenzyl alcohol in place of α-aminomethyl-4-hydroxybenzyl alcohol in the procedure of Example 1, part (a), there is obtained N-2-(3,4-dihydroxyphenyl) - 2 - (2 - hydroxy-1-naphthyl)ethyl-N-isopropylamine, alternatively named as 2-[β-(2-hydroxy-1-naphthyl)-β-(3,4-di-hydroxyphenyl) ethylamino]propane.

Similarly from α - aminomethyl-3-methoxy-4-hydroxybenzyl alcohol and α-aminomethylbenzyl alcohol there are respectively obtained N-2-(3-methoxy-4-hydroxyphenyl)-2-(2-hydroxy-1-naphthyl)ethyl - N - isopropylamine, alternatively named as 2-β-(2-hydroxynaphethyl-1)-β-(3-methoxy-4-hydroxyphenyl)-ethylamino]-propane, and N-2 - phenyl - 2-(2-hydroxy-1-naphthyl)ethyl-N-isopropylamine, alternatively named as 2-[β-(2-hydroxynaphethyl-1)-β-phenylethylamino]-propane.

EXAMPLE 3

N-2-(4-chlorophenyl)-2-(2-hydroxy-1-naphthyl)ethyl-N-isopropylamine (a) By employing α-aminomethyl-4-chlorobenzyl alcohol in place of α-aminoethyl-4-hydroxybenzyl alcohol in the procedure of part (a) of Example 1, there is obtained N - 2 - (4-chlorophenyl)-2-(2-hydroxy-1-naphthyl) ethyl-N-isopropylamine, alternatively named as 2-[β-(2-hydroxy-1-naphythyl)-β-(4-chlorophenyl)ethylaminopropane.

N-2-(4-chlorophenyl)-2-(2 - hydroxy-1-naphthyl)ethyl-N-isopropylamine as its hydrochloride salt is a white crystalline solid having a melting point of 220° C. (dec.).

(b) Alternatively this compound is prepared according to the following procedure:

A solution of 1 g. of 1-(4-chlorophenyl)-2-oxo-1,2-dihydronaphtho[2,1-b]furan (prepared as described by C. O. Guss and R. W. Lerner, J. Am. Chem. Soc., 78, 1236 [1956]), in 13 ml. of isopropylamine is refluxed for 1.5 hours, and then the excess amine is removed by distillation. A solution of the residue in ether is washed with dilute hydrochloric acid, then with water and dried over magnesium sulfate. The dried ethereal solution is concentrated under reduced pressure and the residual solid recrystallized from benezene/petroleum ether to yield N - isopropyl 2-4-chlorophenyl)-2-(4-chlorophenyl)-2-(2-hydroxy-1-naphthyl) acetamide as off-white crystals, M.P. 165° C. (dec.).

A solution of 7.1 g. of N-isopropyl 2-(4-chlorophenyl)-2-(2-hydroxy-1-naphthyl)acetamide in 44 ml. of tetrahydrofuran is added dropwise to 61 ml. of a 1 M solution of borane in tetrahydrofuran maintained at 0° under nitrogen. After the addition, and a reflux period of 4 hours, the cooled reaction mixture is rendered acidic by careful addition of 260 ml. of 3 N aqueous hydrochloric acid (260 ml. of 3 N). The tetrahydrofuran is removed by distillation and the solid which separates from the aqueous phase is recrystallized from ethanol/ether to yield N-2-(4-chlorophenyl)-2-(2-hydroxy - 1 - naphthyl) ethyl-N-isopropylamine as the hydrochloride, M.P. 220° C.

EXAMPLE 4

N-2-(3,4-dichlorophenyl)-2-(2-hydroxy-1-naphthyl) ethyl-N-isopropylamine (a) By employing α-aminomethyl-3,4 - dichlorobenzyl alcohol in place of α-aminomethyl-4-hydroxybenzyl alcohol in the procedure of part (a) of Example 1, there is obtained N-2-(3,4-dichlorophenyl)-2-(2-hydroxy-1-naphthyl) - N - isopropylamine hydrochloride, alternatively named as 2-[β-(2-hydroxy-1-naphthyl)-β-(3-,4-dichlorophenyl)ethylaminopropane hydrochloride.

N - 2-(3,4-dichlorophenyl)-2-(2-hydroxy-1-naphthyl)-ethyl-N-isopropylamine as its hydrochloride is a white crystalline material having a M.P. of 210° C. with a transition at 170.5° C.

(b) Alternatively this compound is prepared in the following manner:

A mixture of 25.0 g. of 3,4-dichloromandelic acid and 34.6 g. of β-naphthol is fused at 200° for 1.5 hours. Ethanol (30 ml.) is added to the cooled mass with good stirring. The insoluble material is collected by filtration and washed with a little ethanol. Recrystallization from acetic acid yields 1-(3,4-dichlorophenyl)-2-oxo-1,2-dihydronaphtho[2,1-b]furan as white needles, M.P. 154.5– 155° C.

A solution of 10 g. of 1-(3,4-dichlorophenyl)-2-oxo-1,2-dihydronaptho[2,1-b]furan (10.0 g.) in 50 ml. of isopropyl amine is refluxed for 2.5 hours. The excess amine is removed by distillation and the residue is recrystallized from ethyl acetate to yield N-isopropyl 2-(3,4-dichlorophenyl)-2-(2-hydroxy-1-naphthyl)acetamide as a white power, M.P. 172.5° C. (dec.).

A solution of 15.0 g. of N-isopropyl 2-(3,4-dichlorophenyl)-2-(2-hydroxy-1-naphthyl)acetamide in 150 ml. of tetrahydrofuran is added dropwise to 116 ml. of a 1 M solution of borane in tetrahydrofuran maintained at 0° under nitrogen. After a four hour reflux period, the cooled (0°) reaction mixture is rendered acidic by the careful addition of 300 ml. of 3 N hydrochloric acid. The tetrahydrofuran is removed by distillation and the white solid which separates is collected and recrystallized from ethanol/ether to yield N-2-(3,4-dichlorophenyl)-2-(2-hydroxy-1-naphethyl)ethyl - N - isopropylamine hydrochloride, M.P. as above.

EXAMPLE 5

N-2-(4-methoxyphenyl)-2-(2-hydroxy-1-naphthyl)ethyl-N-isopropylamine

A solution of 20 g. of 1-(P-methoxyphenyl)-2-oxo-1,2-dihydronaphtho[2,1-b]furan in 150 ml. of isopropyl amine is heated at reflux for 1.5 hours. The excess amine is removed by distillation and the residue dissolved in ether. This solution is washed with 3 N aqueous hydrochloric acid, dried over magnesium sulfate, and concentrated under reduced pressure. The residual solid is recrystallized from benzene/petroleum ether to yield N-isopropyl 2-(2-hydroxy-1-naphthyl)-2-(4-methoxyphenyl) acetamide as off-white crystals, M.P. 138° C. (dec.).

A solution of 14.0 g. of N-isopropyl 2-(2-hydroxy-1-naphthyl)-2-(4-methoxyphenyl)acetamide in 200 ml. of tetrahydrofuran is added dropwise to 120 ml. of a 1 M solution of borane in tetrahydrofuran maintained at 0° under nitrogen. After the addition is complete, the reaction mixture is refluxed for 12 hours. The cooled reaction mixture is acidified by careful addition of 480 ml. of 3 N aqueous hydrochloric acid and the tetrahydrofuran is then removed by distillation. The white solid which separates from the aqueous phase is collected and dried by azeotropic distillation with ethanol/benzene. The off-white solid thus obtained, M.P. 228° C. (dec.), is recrystallized twice from ethanol/ether to yield N-2-(4- methoxyphenyl)-2-hydroxy-1-naphthyl)ethyl-N-isopropylamine hydrochloride as white crystals, M.P. 236° C. (dec.).

EXAMPLE 6

N-2-(3-chloro-4-hydroxyphenyl)-2-(2-hydroxy-1-naphthyl)ethyl-N-isopropylamine Chlorine is passed into a solution of 100 g. of methoxyoxyacetophenone in 360 ml. of glacial acetic acid at such a rate that the temperature is maintained at about 60°. The chlorination may be assumed complete when the temperature begins to fall. The cooled yellow solution is poured onto ice with good stirring and then allowed to stand for overnight. The separated solid is collected and is recrystallized from ethanol to yield 4'-methoxy-2,2,3'-trichloroacetophenone white crystals, M.P. 101.5–103° C.

4'-methoxy-2,2,3'-trichloroacetophenone (100 g.) is added over a two hour period to a solution of 61 g. of sodium hydroxide in 550 ml. of water at 60°. When all of the solid is dissolved, the reaction mixture is cooled and rendered acidic by the addition of 67 ml. of concentrated hydrochloric acid. The precipitated solid is collected and recrystallized from a large volume of toluene to yield 3-chloro-4-methoxymandelic acid as white crystals, M.P. 134–137° C. Further recrystallization from water yields material having a melting point of 136.5–137° C.

A mixture of 21.6 g. of 3-chloro-4-methoxymandelic acid (21.6 g.) and 28.8 g. of β-naphthol is heated at 170° for 30 minutes and then at 200° for 15 minutes. The cooled mass is warmed with 25 ml. of ethanol (25 ml.) and the crystals which separate out are collected and washed with a little chilled ethanol. Recrystallization from carbon tetrachloride affords 1-(3-chloro-4-methoxyphenyl)-2-oxo-1,2-dihydronaphtho[2,1-b]furan as white crystals, M.P. 168–170° C.

A solution of 15.0 g. of 1-(3-chloro-4-methoxyphenyl)-2-oxo-1,2-dihydronaphtho[2,1-b]furan in 170 ml. of acetic acid and 48 ml. of 48% aqueous hydrogen bromide is refluxed for 18 hours. Upon cooling, the reaction mixture deposits white crystals which are collected and recrystallized from benzene to yield 1-(3-chloro-4-hydroxyphenyl)-2-oxo-1,2-dihydronaphtho[2,1-b]furan, M.P. 171–173° C.

A solution of 12.0 g. of 1-(3-chloro-4-hydroxyphenyl)-2-oxo-1,2-dihydronaphtho[2,1-b] furan in 120 ml. of isopropylamine is refluxed for 2.5 hours. The excess amine is removed by distillation and a solution of the residue in ether is washed with aqueous hydrochloric acid and then with water. The ethereal solution is dried over magnesium sulfate and concentrated under reduced pressure and the residual solid is recrystallized from benzene to yield N-isopropyl 2-(3-chloro-4-hydroxyphenyl)-2-(2-hydroxy-1-naphthyl)acetamide as off-white crystals, M.P. 172° C. (dec.).

A solution of 10.1 g. of N-isopropyl 2-(3-chloro-4-hydroxyphenyl)-2-(2-hydroxy-1-naphthyl) acetamide in 150 ml. of tetrahydrofuran is added dropwise to 82 ml. of a 1 M solution of borane in tetrahydrofuran maintained at 0° under nitrogen. After the addition and a period of 3.5 hours at reflux, the cooled reaction mixture is rendered acidic by the careful addition of 320 ml. of 3 N aqueous hydrochloric acid. The tetrahydrofuran is removed by distillation and the solid which separates from the aqueous phase is collected and recrystallized twice from ethanol/ether to yield N-2-(3-chloro-4-hydroxyphenyl)-2-(2-hydroxy-1-naphthyl)ethyl-N-isopropylamine hydrochloride as white crystals, M.P. 258° C. (dec.).

EXAMPLE 7

N-2-(3-chloro-4-methoxyphenyl)-2-(2-hydroxy-1-naphthyl)ethyl-N-isopropylamine A solution of 15.2 g. of 1-(3-chloro-4-methoxyphenyl)-2-oxo-1,2-dihydronaphtho[2,1-b] furan in 53 ml. of isopropylamine is refluxed for 2.5 hours and the excess amine is then removed by distillation. A solution of the residue in ethyl acetate is wasted with half-saturated aqueous ammonium chloride solution, dried over sodium sulfate and concentrated under reduced pressure to yield N-isopropyl-2-(3-chloro-4-methoxyphenyl)-2-(2-hydroxy-1-naphthyl)acetamide as tan crystals.

A solution of N-isopropyl 2-(3-chloro-4-methoxyphenyl)-2-(2-hydroxy-1-naphthyl) acetamide in 105 ml. of tetrahydrofuran is added dropwise to 140 ml. of a 1 M solution of borane in tetrahydrofuran maintained at 0° under nitrogen. After the addition is complete, the reaction mixture is refluxed for 4 hours, cooled and rendered acidic by the careful addition of 612 ml. of 3 N hydrochloric acid. The tetrahydrofuran is removed by distillation and the solid which separates from the aqueous phase is collected by filtration and recrystallized several times from ethanol/ether to yield N-2-(3-chloro-4-methoxyphenyl)-2-(2-hydroxy -1 - naphthyl)ethyl - N - isopropylamine hydrochloride, as a white crystalline solid, M.P. 254.5° C. (dec.).

EXAMPLE 8

N-2-(4-hydroxyphenyl)-2-(2-hydroxy-1-naphthyl)ethyl-N-tert-butylamine

A mixture of 12.3 g. of 1-(4-hydroxyphenyl)-2-oxo-1,2-dihydronaphtho[2,1-b]furan and 120 ml. of tert-butylamine is refluxed for 17 hours and then stripped of excess amine by distillation. The residue is recrystallized from benzene to give N-tert-butyl 2-(2-hydroxy-1-naphthyl)-2-(4-hydroxyphenyl)acetamide as tan crystals, M.P. 178.5° C. (dec.). This material is treated with borane as previously described to yield N-2-(4-hydroxyphenyl-2-(2-hydroxy-1-naphthyl)ethyl-N-tert-butylamine hydrochloride as an off-white crystalline solid, M.P. 229° C. (dec.).

EXAMPLE 9

N-2-(4-hydroxyphenyl)-2-(2-hydroxy-1-naphthyl)ethyl-N-sec-butylamine

A mixture of 10 g. of 1-(4-hydroxyphenyl)-2-oxo-1,2-dihydronaphtho[2,1-b]furan and 63 ml. of sec-butylamine is refluxed for five hours. The excess amine is removed by filtration and the residue dried in vacuo to yield N-sec-butyl 2-(2-hydrovy-1-naphthyl)-2-(4-hydroxyphenylacetamide.

A solution of 14.4 g. of N-2-butyl 2-(2-hydroxy-1-naphthyl)-2-(4-hydroxyphenyl)acetamide in 150 ml. of tetrahydrofuran is added dropwise to 124 ml. of a 1 M solution of borane is terahydrofuran maintained at 0° under nitrogen. After being heated at reflux for 3.5 hours, the cooled (0°) reaction mixture is rendered acidic by the careful addition of 320 ml. of 3 N hydrochloric acid. The tetrahydrofuran is removed by distillation and the solid which separates from the aqueous phase is collected and recrystallized several times from ethanol/ether to yield N-2-(4-hydroxyphenyl)-2-(2-hydroxy-1 - naphthyl)ethyl-N-sec-butylamine hydrochloride as an off-white crystalline solid, M.P. 229° C. (dec.).

EXAMPLE 10

N-2-phenyl-2-(2-hydroxy-1-naphthyl)ethyl-N-t-butylamine

A mixture of 15 g. of 1-phenyl-2-oxo-1,2-dihydronaphtho[2,1-b]furan (prepared as described by Bistrzycki and Flatan, Ber., 30, 124) and 100 ml. of tert.-butylamine is refluxed for 18 hours. The resulting solution is concentrated under reduced pressure and the solid recrystallized from benzene to yield N-tert-butyl 2-(2-hydroxy - 1 - naphthyl) - 2-phenylacetamide, M.P. 190° (dec.).

A solution of 15 g. of N-tert-butyl 2-(2-hydroxy-1-naphthyl)-2-phenylacetamide in 100 ml. of tetrahydrofuran is added dropwise to 135 ml. of a 1 M solution of borane in tetrahydrofuran maintained at 0° under nitrogen. After addition and a 3.5 hour period at reflux, the reaction mixture is cooled and rendered acidic by the careful addition of 400 ml. of 3 N hydrochloric acid. The tetrahydrofuran is removed by distillation and the white solid which separates from the aqueous phase is collected and recrystallized from ethanol/ether to yield N - 2 - phenyl - 2 - (2-hydroxy-1-naphthyl)ethyl-N-tert-butylamine hydrochloride as white crystals, m.p. 250° C. (dec.).

EXAMPLE 11

N-2-(4-hydroxyphenyl)-2-(2-hydroxy-1-naphthyl) ethyl-N-isobutylamine

A mixture of 1-(4-hydroxyphenyl)-2-oxo-1,2-dihydro naphtho[2,1-b]furan (15.0 g.) and isobutylamine (100 ml.) are refluxed for 4 hours and then distilled to remove excess solvent. The residue is warmed with benzene and the white crystalline N-isobutyl 2-(2-hydroxy-1-naphthyl) 2-4-hydroxyphenyl)acetamide which separates from the benzene is collected; M.P. 154–159° C.

A solution of N-isobutyl 2-(2-hydroxy-1-naphthyl)-2-(4-hydroxyphenyl)acetamide (11.8 g.) in tetrahydrofuran (100 ml.) is added dropwise to 105 ml. of a 1 M solution of borane in tetrahydrofuran maintained at 0° under nitrogen. After a period of four hours at reflux, the reaction mixture is cooled (0°) and rendered acidic by the careful addition of 420 ml. of 3 N hydrochloric acid. The tetrahydrofuran is removed by distillation and the sticky white solid which separates from the aqueous phase is dried by azeotropic distillation with ethanol/benzene. Recrystallization of the dried solid from ethanol/ether yields N-2-(4-hydroxyphenyl)-2-(2-hydroxy-1-naphthyl)ethyl-N-isobutylamine as white crystals, M.P. 217° C. (dec.) as the hydrochloride.

EXAMPLE 12

N-2-(4-fluorophenyl)-2-(2-hydroxy-1-naphthyl) ethyl-N-tert-butylamine

A mixture of p-fluoromandelic acid (20.0 g.) and β-naphthol (34 g.) is heated at 210° C. for two hours. The cooled mass is taken up in 20 ml. of hot ethanol and allowed to stand at room temperature overnight. The separated solid is collected and washed with a little ethanol giving white crystals which are recrystallized from heptane to yield 1-(4-fluorophenyl)-2-oxo-1,2-dihydronaphtho[2,1-b]furan as long white needles, M.P. 129–130° C.

A mixture of 1-(4-fluorophenyl)-2-oxo-1,2-dihydronaphtho[2,1-b]furan (12.5 g.) and tert-butylamine (120 ml.) is refluxed for six hours. The excess amine is removed by distillation and the residue is recrystallized from benzene/petroleum ether to yield N-tert-butyl 2-(4-fluorophenyl)-2-(2-hydroxy-1-naphthyl)acetamide as tan crystals, M.P. 147° C. (dec.).

A solution of N-tert-butyl 2-(4-fluorophenyl)-2-(2-hydroxy-1-naphthyl)acetamide (13.1 g.) in tetrahydrofuran (75 ml.) is added dropwise to 110 ml. of a 1 M solution of borane in tetrahydrofuran maintained at 0° under nitrogen. After the reaction mixture is refluxed for four hours, it is cooled (0°) and rendered acidic by the careful addition of 300 ml. of 3 N hydrochloric acid. The tetrahydrofuran is removed by distillation and the sticky white solid which separates is collected and is dried by azeotropic distillation with ethanol/benzene. The dried solid is recrystallized from ethanol/ether to yield N-2-(4-fluorophenyl) - 2 - (4 - fluorophenyl) - 2 - (2-hydroxy-1-naphthyl)ethyl-N-tert-butylamine hydrochloride as white crystals, M.P. 256° (dec.).

EXAMPLE 13

N-2-(4-hydroxyphenyl)-2-(2-hydroxy-6-bromo-1-naphthyl)ethyl-N-isopropylamine

A mixture of 6-bromo-2-naphthol (51.2 g.) and p-methoxymandelic acid (20.6 g.) is heated at 180° for 25 minutes and then at 200° for 10 minutes. Ethanol (50 ml.) is added to the cooled mixture and the insoluble material is collected to yield 7-bromo-1-(4-methoxyphenyl)-2-oxo-1,2-dihydronaphtho[2,1-b]furan as a tan powder, M.P. 173.5–176.5° C.

A mixture of 36.9 g. of 7-bromo-1-(4-methoxyphenyl)-2-oxo-1,2-dihydronaphtho[2,1-b]furan, 355 ml. of acetic acid and 121 ml. of 48% aqueous hydrogen bromide is refluxed for 4 hours. The product which separates from the cooled reaction mixture is collected and washed well with aqueous ethanol. Several recrystallizations from aqueous acetic acid yields 7-bromo-1-(4-hydroxyphenyl) 2-oxo-1,2-dihydronaphtho[2,1-b]furan as light yellow crystals, M.P. 230–234° C. A mixture of 7.8 g. of this compound and 70 ml. of isopropyl amine is refluxed for 5 hours. Excess amine is distilled from the reaction mixture and the residue is rinsed with cold benzene to give N - isopropyl - 2-(6-bromo-2-hydroxy-1-naphthyl)-2-(4-hydroxyphenyl)acetamide as tan powder, M.P. 219–221° C. (dec.).

A solution of 9.0 g. of N-isopropyl 2-(6-bromo-2-hydroxy - 1-naphthyl)-2-(4-hydroxyphenyl)acetamide in 100 ml. of tetrahydrofuran is added dropwise to 66 ml. of a 1 M solution of borane in tetrahydrofuran maintained at 0° under nitrogen. After the addition is complete, the reaction mixture is refluxed for 4.5 hours. The cooled reaction mixture is then rendered acidic by the careful addition of hydrochloric acid (280 ml., 3 N) and the tetrahydrofuran is removed by distillation. The solid which separates from the aqueous phase is collected and dried by azeotropic distillation with ethanol/benzene. Several recrystallizations from ethanol/ether yields N-2-(4 - hydroxyphenyl)-2-(2-hydroxy-6-bromo-1-naphthyl) ethyl-N-isopropylamine hydrochloride as white crystals, M.P. 244.5° C. (dec.).

EXAMPLE 14

N-2-(4-hydroxyphenyl)-2-(2,7-dihydroxy-1-naphthyl) ethyl-N-tert-butylamine

A mixture of 2,7-dihydroxynaphthalene (19.9 g.) and p-methoxymandelic acid (11.1 g.) is heated at 180° for 1.5 hours. The cooled mass is treated with hot ethanol and the insoluble material is collected and recrystallized from aqueous acetic acid to yield 8-hydroxy-1-(4-methoxyphenyl)-2-oxo - 1,2 - dihydronaphtho[2,1-b]furan as pale green crystals, M.P. 211–212° C.

A mixture of 9.4 g. of 8-hydroxy-1-(4-methoxyphenyl)-2-oxo-1,2-dihydronaphtho[2,1-b]furan, 100 ml. of acetic acid, and 36 ml. of 48% aqueous hydrogen bromide is refluxed for 4.5 hours. The product which crystalizes from the cooled reaction mixture is collected and recrystallized from aqueous acetic acid to yield 8-hydroxy-1-(4-hydroxyphenyl)-2-oxo-1,2-dihydronaphtho[2,1 - b]furan as pale yellow crystals, M.P. 245–247° C. (dec.).

A mixture of 4.6 g. of 8-hydroxy-1-(4-hydroxyphenyl)-2-ox-1,2-dihydronaphtho[2,1-b]furan and 43 ml. of tert-butylamine is refluxed for 4.5 hours. After removal of the excess amine by distillation, N-tert-butyl 2-(2,7-dihydroxy-1-naphthyl)-2-(4 - hydroxyphenyl)acetamide is obtained as grey crystals, M.P. 102° C. (dec.).

A solution of 15 g. of N-tert-butyl 2-(2,7-dihydroxy-1-naphthyl)-2-(4-hydroxyphenyl)acetamide in 150 ml. of tetrahydrofuran is added dropwise to 124 ml. of a 1 M solution of borane in tetrahydrofuran maintained at 0° under nitrogen. After the addition is complete, the reaction mixture is refluxed for 4 hours. The cooled reaction mixture is rendered acidic by the careful addition of 525 ml. of 3 N hydrochloric acid and the tetrahydrofuran is then removed by distillation and the solid which separates is collected and dried by azeotropic distillation with ethanol/benzene. Several recrystallizations from ethanol/ether yields N-2-(4-hydroxyphenyl)-2-(2,7-dihydroxy-1-naphthyl)ethyl-N-tert-butylamine hydrochloride as white crystals, M.P. 199.5° C. (dec.).

EXAMPLE 15

N-2-phenyl-2-(2,8-dihydroxy-1-naphtyl)ethyl-N-isopropylamine

A mixture of 1,7-dihydroxynaphthalene (52 g.) and mandelic acid (30.4 g.) is heated at 210° C. for 3.5 hours, cooled and treated with 50 ml. of hot ethanol. The crystals which separate from the solution, after being allowed to cool overnight, are collected and washed with a little chilled ethanol. Recrystallization from aqueous acetic acid yields 9-hydroxy-1-phenyl-2-oxo-1,2-dihydronaptho-[2,1-b]furan as a grey powder, M.P. 223.5–228° C.

A mixture of 9-hydroxy-1-phenyl-2-oxo-1,2-dihydronaphtho[2,1-b]furan (11.9 g.) and isopropyl amine (100 ml.) are refluxed for 3 hours. Excess amine is removed by distillation to yield N-isopropyl 2-(2,8-dihydroxy-1-naphthyl)-2-phenylacetamide as a dark powder, M.P. 80–90° C. (dec.).

A solution of 16.7 g. of N-isopropyl 2-(2,8-dihydroxy-1-naphthyl)-2-phenylacetamide in 100 ml. of tetrahydrofuran is added dropwise to 150 ml. of a 1 M solution of borane in tetrahydrofuran maintained at 0° under nitrogen. After the addition is complete, the reaction mixture is refluxed for 3.5 hours, cooled, rendered acidic by the careful addition of 500 ml. of 3 N aqueous hydrochloric acid and the tetrahydrofuran is removed by distillation. The aqueous phase is decanted from the yellow sticky solid which separates and the solid is dried by azeotropic distillation with ethanol/benzene and then recrystallized from ethanol/ether to yield N-2-phenyl-2-(2,8-dihydroxy-1-naphthyl)ethyl-N-isopropylamine hydrochloride as a grey powder, M.P. 238° C. (dec.).

EXAMPLE 16

N-2-(4-methoxyphenyl)-2-(2-hydroxy-3-hydroxymethyl-1-naphthyl)ethyl-N-isopropylamine A mixture of 10 g. of 2-hydroxy-3-naphthoic acid and 4.85 g. of p-methoxymandelic acid in 30 ml. of acetic acid containing 500 mg. of p-toluene sulfonic acid is refluxed for 6.5 hours. The material which crystallizes from the reaction mixture is collected and washed with hot acetic acid to yield 4-carboxy-1-(4-methoxyphenyl)-2-oxo-1,2-dihydronaphtho[2,1-b]furan as light yellow crystals, M.P. 312–324° (dec.).

A mixture of 16.6 g. of 4-carboxy-1-(4-methoxyphenyl)-2-oxo-1,2-dihydronaphtho[2,1-b]furan and 160 ml. of isopropylamine is refluxed overnight and excess amine is removed by distillation. A solution of the residue in ethyl acetate is washed with aqueous hydrochloric acid and then with water, dried over magnesium sulfate and concentrated under reduced pressure to yield N-isopropyl-2-(3-carboxy-2-hydroxy-1 - naphthyl)-2 - (4 - methoxyphenyl)acetamide as yellow crystals, M.P. 90° C. (dec.).

A solution of 12.0 g. of N-isopropyl 2-(3-carboxy-2-hydroxy-1-naphthyl)-2-(4 - methoxyphenyl)acetamide in 130 ml. of tetrahydrofuran is added dropwise to 98 ml. of a 1 M solution of borane in tetrahydrofuran maintained at 0° under nitrogen. After the addition is complete, the reaction mixture is refluxed for 3.5 hours. The cooled reaction mixture rendered acidic by the careful addition of 410 ml. of 3 N hydrochloric acid and the tetrahydrofuran is then removed by distillation. The solid which separates from the aqueous phase is collected and dried by azeotropic distillation with ethanol/benzene, and recrystallized from ethanol/ether to yield N-2-(4-methoxyphenyl)-2-(2-hydroxy-3-hydroxymethyl - 1 - naphthyl)ethyl-N-isopropylamine hydrochloride as white crystals, M.P. 179° C. (dec.).

EXAMPLE 17

N-2(4-hydroxyphenyl)-2-(2-hydroxy-1-naphthyl)ethyl-N-[2-(4-hydroxyphenyl)ethyl]amine A mixture of 7.8 g. of 1-(4-hydroxyphenyl)-2-oxo-1,2-dihydronaphtho[2,1-b]furan and 4.0 g. of tyramine in 100 ml. of ethanol is refluxed for 18 hours. Excess ethanol is then removed by distillation and the residue is suspended in boiling benzene. Sufficient ethanol is added to effect solution, and the solution is filtered and diluted with benzene to the cloud-point. After standing overnight, the solution deposits N-p-hydroxypheneth-2'-yl-2-(4-hydroxyphenyl)-2-(hydroxy-1-naphthyl)acetamide as tan crystals, M.P. 155–160°.

A solution of N-p-hydroxypheneth-2'-yl 2-(4-hydroxyphenyl)-2-(2-hydroxy-1-naphthyl)acetamide (5.9 g.) in 75 ml. of tetrahydrofuran is added dropwise to 100 ml. of a 1 M solution of borane in tetrahydrofuran maintained at 0° under nitrogen. After a 4-hour reflux period, the cooled (0°) reaction mixture is rendered acidic by the careful addition of 400 ml. of 3 N hydrochloric acid. The tetrahydrofuran is removed by distillation and the white solid which separates from the aqueous phase is collected and recrystallized from ethanol/ether to yield N-2-(4-hydroxyphenyl)-2-(2-hydroxy-1-naphthyl)ethyl - N - [2-(4-hydroxyphenyl)ethyl]amine, M.P. 242° C. (dec.). as the hydrochloride.

EXAMPLE 18

N-2-(4-hydroxyphenyl)-2-(2-hydroxy-1-naphthyl)ethyl-N-isopropylamine

A solution of 5.4 g. of N-isopropyl 2-(2-hydroxyl-1-napthyl)-2-(4-hydroxyphenyl)acetamide in 50 ml. of tetrahydrofuran is added dropwise over a 45 minute period to a suspension of 2.0 g. of lithium aluminum hydride in 100 ml. of tetrahydrofuran maintained at room temperature. After the addition, and an additional one hour at ambient temperature, the reaction mixture is heated at reflux for 2.5 hours. Ethanol (15 ml.) is added cautiously to the cooled reaction mixture, followed by 170 ml. of 3 N hydrochloric acid. The organic solvents are removed by distillation and the sticky tan solid which separates from the aqueous phase is collected and dried by azeotropic distillation with ethanol/benzene. The dried solid is extracted with ether and the ether insoluble material is recrystallized from ethanol/ether to give the product as the hydrochloride, identical with that prepared in accordance with the procedure of Example 1.

EXAMPLE 19

N-2-(4-hydroxyphenyl)-2-(2-hydroxy-1-naphthyl)ethyl-N-ethylamine

By substituting ethylamine for isopropylamine in the alternative procedure of Example 1 wherein the isopropylamine is allowed to react with 1-(p-hydroxyphenyl)-2-oxo-1,2-dihydronaphtho[2,1-b]furan and thereafter executing the procedures therein described, there is obtained N-2-(4-hydroxyphenyl)-2-(2-hydroxy-1-naphthyl) - ethyl-N-ethylamine hydrochloride, M.P. 237° C. (dec.). Likewise from n-propylamine there is obtained N-2-(hydroxyphenyl) - 2-(2-hydroxy-1-naphthyl)ethyl-N-n-propylamine hydrochloride, M.P. 224° C.

EXAMPLE 20

N-2-(4-hydroxyphenyl)-2-(2-hydroxy-1-naphthyl)ethyl-N-isopropylamine

Twenty-eight milliliters of 10% aqueous sodium hydroxide are added to a cooled solution of 10 g. of p-acetoxybenzaldehyde and 11 g. of nitromethane in 50 ml. of ethanol at such a rate that the reaction temperature does not exceed 0°. After the addition is complete, 236 ml. of 2% aqueous acetic acid are added and the reaction mixture is held at 0° for 4 hours. The reaction mixture is extracted with ether and these ethereal extracts are washed with water, dried over sodium sulfate and concentrated under reduced pressure to yield 2-(4-acetoxyphenyl)-2-hydroxynitroethane as a heavy oil.

A solution of 12.5 g. of 2-(4-acetoxyphenyl)-2-hydroxynitroethane in 450 ml. of acetone containing 5% palladium-on-charcoal is shaken under hydrogen at 900 lb./in.$^2$ and room temperature for 49 hours. The reaction mixture is filtered, and 5 g. of oxalic acid are added to the filtrate. The resulting solution is concentrated under reduced pressure, maintaining the temperature below 38° C., to yield N-isopropyl 2-(4-acetoxyphenyl) - 2 - hydroxyethylamine oxalate as a white solid, M.P. 212–214°.

A mixture of 5 g. of N-isopropyl 2-(4-acetoxyphenyl)-2-hydroxyethylamine oxalate, 8.7 g. β-naphthol and 3.4 g. of p-toluenesulfonic acid in 10 ml. of acetic acid is heated on a steam bath for 2 hours. After removal of the acetic acid at reduced pressure, the residue is diluted with water and washed with ether. The aqueous portion is rendered basic with aqueous ammonia, and then extracted with ether. The ethereal extracts are washed well with water, dried over sodium sulfate and concentrated under reduced pressure. The residual solid is dissolved in ethanol and treated with ethanolic hydrogen chloride. The solution is clarified with charcoal, filtered, and diluted with ether to the cloudpoint. Storage at −25° C. yields the desired product as the hydrochloride which is identical with that obtained according to the procedure of Example 1.

EXAMPLE 21

N-2-(4-hydroxyphenyl)-2-(2-hydroxy-1-naphthyl)ethyl-N-isopropylamine maleate

A solution of 1 g. of N-2-(4-hydroxyphenyl)-2-(2-hydroxy-1-naphthyl)ethyl - N - isopropylamine, alternatively named as 2-[β-2-hydroxynaphthyl-1)-β-(4-hydroxyphenylethylamino]propane, as the free base in hot methanol is treated with an excess of a solution of maleic acid in methanol. The resulting solution is concentrated and cooled to yield the maleate salt of N-2-(4-hydroxyphenyl)-2-(2-hydroxy-1-napthyl)ethyl-N - isopropylamine. In a similar fashion, other salts are prepared from the corresponding acids.

EXAMPLE 22

N-2-(4-hydroxyphenyl)-2-(2-hydroxy-1-naphthyl)ethyl-N,N-diethylamine

A mixture of 15 g. of 1-(4-hydroxyphenyl-2-oxo-1,2-dihydronaphtho[2,1-b]furan and 95 ml. of diethylamine is refluxed for 17 hours. The solid which separates upon cooling is collected and washed with ether to yield N,N-diethyl-2-(2-hydroxy-1-naphthyl)-2-(4 - hydroxyphenyl)-acetamide as a white powder, M.P. 134° C. (dec.).

Sixteen grams of N,N-diethyl 2-(2-hydroxy-1-naphthyl)-2-(4-hydroxyphenyl)acetamide are added portionwise to 138 ml. of a 1 M solution of borane in tetrahydrofuran maintained at 0° under nitrogen. After addition, the reaction mixture is refluxed for 4 hours, cooled, acidified by the careful addition of 355 ml. of 3 N hydrochloric acid and the tetrahydrofuran is removed by distillation. The aqueous phase is decanted and the solid is dried by azeotropic distillation with ethanol/benzene. Recrystallization from ethanol/ether yields N-2-(4-hydroxyphenyl)-2-(2-hydroxyl-1 - naphthyl)ethyl - N,N - diethylamine hydrochloride as the monoethanolate which is a white crystalline solid, M.P. 165–170° (after a loss of ethanol at 102°). This compound is converted by treatment with aqueous sodium hydroxide to the free base obtained as a white powder, M.P. 198° C. (dec.).

EXAMPLE 23

N-2-(4-hydroxyphenyl)-2-(2,3-dihydroxy-1-napthyl)-ethyl-N-tert-butylamine

A mixture of 2,3-dihydroxynaphthalene (19.9 g.) and p-methoxymandelic acid (11.3 g.) is heated at 180° for 1.5 hours. Twenty-eight milliliters of ethanol are added to the cooled mass with good stirring and the insoluble material is collected and recrystallized from acetic acid to give 4-hydroxy-1-(4-methoxyphenyl)-2-oxo-1,2 - dihydronaphtho[2,1 - b]furan as tan crystals, M.P. 205–207.5° C.

A mixture of 9 g. of 4-hydroxy-1-(4-methoxyphenyl)-2-oxo-1,2-dihydronaphtho[2,1-b]furan, 95 ml. of acetic acid and 34 ml. of 48% aqueous hydrogen bromide is refluxed for 4.5 hours. Upon cooling to 0°, the reaction mixture deposits red-orange crystals; dilution of the mother liquors with water affords additional material. The combined crops are recrystallized from aqueous acetic acid to yield 4 - hydroxy-1-(4-hydroxyphenyl)-2-oxo-1,2-dihydronaphtho[2,1-b]furan as light tan crystals, M.P. 247–254° C.

A mixture of 4.4 g. of 4-hydroxy-1-(4-hydroxyphenyl)-2-oxo-1,2-dihydronaphtho[2,1-b]furan in 40 ml. of tert-butylamine is refluxed for 23 hours. The excess amine is removed by distillation to yield N-tert-butyl-2-(2,3-dihydroxy-1-naphthyl) - 2 - (4-hydroxyphenyl)acetamide as dark crystals, M.P. 94–97° C. (dec.).

A solution of 15 g. of N-tert-butyl-2-(2,3-dihydroxy-1-naphthyl) - 2 - (4-hydroxyphenyl)acetamide in 150 ml. of tetrahydrofuran is added dropwise to 124 ml. of a 1 M solution of borane in tetrahydrofuran maintained at 0° under nitrogen. After the addition, the reaction mixture is refluxed for 4 hours, cooled, rendered acidic by the careful addition of 525 ml. of 3 N hydrochloric acid and the tetrahydrofuran is removed by filtration. The solid which separates from the aqueous phase of the residue is collected and dried by azeotropic distillation with ethanol/benzene giving a tan crystalline solid, which resists recrystallization. The solid, converted to the free base with ammonia and the free base is chromatographed on silicon dioxide absorbent (Anasil type B). Elution with ethanol/benzene (1:10) gives a light tan powder which is rechromatographed on silicon dioxide absorbent (Anasil type B). Upon elution with benzene, the amine is obtained as a tan powder, which after conversion to its hydrochloride salt is recrystallized from ethanol/ether to give N-2-(4-hydroxyphenyl - 2 - (2,3-dihydroxy-1-naphthyl)ethyl-N-tert-butylamine hydrochloride as tan crystals, M.P. 198° C. (dec.).

EXAMPLE 24

| Ingredient: | Quantity/capsule, mg. |
|---|---|
| N - 2 - (4-hydroxyphenyl) - 2 - (2-hydroxy-1-naphthyl)ethyl - N - isopropylamine hydrochloride | 250 |
| Lactose | 150 |
| Magnesium stearate | 3 |

The foregoing ingredients are mixed and introduced into a two-piece No. 2 hard gelatin capsule.

EXAMPLE 25

| Ingredient: | Quantity/tablet, mg. |
|---|---|
| N - 2 - (4-hydroxyphenyl) - 2 - (2-hydroxy-1-naphthyl)ethyl - N - t-butylamine hydrochloride | 500 |
| Lactose | 80 |
| Corn starch | 70 |
| Soluble starch | 15 |
| Magnesium stearate | 5 |

The first three ingredients are thoroughly mixed and granulated with a solution of the soluble starch. This granulate is dried, mixed with the magnesium stearate and pressed into tablet cores which are coated as with sugar.

EXAMPLE 26

To 50 g. of N - 2-(4-hydroxyphenyl-2-(2-hydroxy-1-naphthyl)-N-isopropylamine hydrochloride and 3 g. of chlorobutanol is dissolved in water for injection, q.s. 1000

What is claimed is:
1. A compound selected from the group consisting of an amine of the formula:

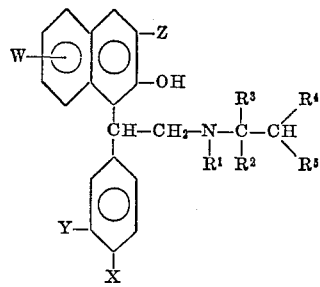

wherein
each of X and Y is hydrogen, hydroxy, methoxy, chloro or fluoro;
W is hydrogen, chloro, fluoro, bromo or hydroxy;
Z is hydrogen, hydroxy or hydroxymethyl;
$R^1$ is hydrogen or (lower)alkyl;
each of $R^2$, $R^3$ and $R^4$, independent of the other, is hydrogen, methyl or ethyl; and
$R^5$ is hydrogen, methyl, ethyl, phenyl, or hydroxyphenyl; and
the pharmaceutically acceptable nontoxic acid addition salts thereof.

2. A compound according to claim 1 wherein Y is hydrogen or chloro; W is hydrogen or hydroxy; Z is hydrogen; $R^1$ is hydrogen and each of $R^2$, $R^3$, $R^4$ and $R^5$ is hydrogen or methyl, at least one of $R^2$, $R^3$, $R^4$ and $R^5$ being methyl.

3. A compound according to claim 2 wherein $R^2$ is methyl and $R^3$, $R^4$ and $R^5$ is hydrogen.

4. A compound according to claim 3 wherein the amine is N-2-(4-hydroxyphenyl)-2-(2-hydroxy-1-naphthyl)ethyl-N-isopropylamine.

5. The hydrochloride acid addition salt of the amine of claim 4.

6. A compound according to claim 3 wherein the amine is N-2-(4-methoxyphenyl)-2-(2-hydroxy-1-naphthyl)ethyl-N-isopropylamine.

7. A compound according to claim 3 wherein the amine is N-2-(4-chlorophenyl)-2-(2-hydroxy-1-naphthyl)ethyl-N-isopropylamine.

8. A compound according to claim 3 wherein the amine is N-2-(3-chloro-4-hydroxyphenyl)-2-(2-hydroxy-1-naphthyl)ethyl-N-isopropylamine.

9. A compound according to claim 3 wherein the amine is N-2-(3-chloro-4-methoxyphenyl)-2-(2-hydroxy-1-naphthyl)ethyl-N-isopropylamine.

10. A compound according to claim 3 wherein the amine is N-2-(3,4-dichlorophenyl)-2-(2-hydroxy-1-naphthyl)ethyl-N-isopropylamine.

11. A compound according to claim 3 wherein the amine is N-2-phenyl-2-(2,8-dihydroxy-1-naphthyl)ethyl-N-isopropylamine.

12. A compound according to claim 2 wherein each of $R^2$ and $R^3$ is methyl and each of $R^4$ and $R^5$ is hydrogen.

13. A compound according to claim 12 wherein the amine is N-2-(4-hydroxyphenyl)-2-(2-hydroxy-1-naphthyl)ethyl-N-t-butylamine.

14. A compound according to claim 12 wherein the amine is N-2-phenyl-2-(2-hydroxy-1-naphthyl)ethyl-N-t-butylamine.

15. A compound according to claim 12 wherein the amine is N-2-(4-fluorophenyl)-2-(2-hydroxy-1-naphthyl)ethyl-N-t-butylamine.

16. A compound according to claim 12 wherein the amine is N-2-(4-hydroxyphenyl)-2-(2,7-dihydroxy-1-naphthyl)ethyl-N-t-butylamine.

17. A compound according to claim 1 wherein the amine is N-2-phenyl-2-(2-hydroxy-1-naphthyl)ethyl-N-4-hydroxyphenethylamine.

18. A compound according to claim 1 wherein the amine is N-2-(4-hydroxyphenyl)-2-(2-hydroxy-1-naphthyl)ethyl-N-sec-butylamine.

19. A compound according to claim 1 wherein the amine is N-2-(4-hydroxyphenyl)-2-(2-hydroxy-1-naphthyl)ethyl-N-isobutylamine.

20. A compound according to claim 1 wherein the amine is N-2-(4-hydroxyphenyl)-2-(2-hydroxy-1-naphthyl)ethyl-N,N-diethylamine.

21. A compound according to claim 1 wherein the amine is N-2-(4-hydroxyphenyl)-2-(2,3-dihydroxy-1-naphthyl-ethyl-N-t-butylamine.

22. A compound according to claim 1 wherein the amine is N-2-(4-hydroxyphenyl)-2-(2-hydroxy-6-bromo-1-naphthyl)ethyl-N-isopropylamine.

23. A compound according to claim 1 wherein the amine is N-2-(4-methoxyphenyl)-2-(2-hydroxy-3-hydroxymethyl-1-naphthyl)ethyl-N-isopropylamine.

24. A compound according to claim 1 wherein the amine is the dextrorotatory isomer.

25. A compound according to claim 1 wherein the amine is the levorotatory isomer.

26. A compound of the formula:

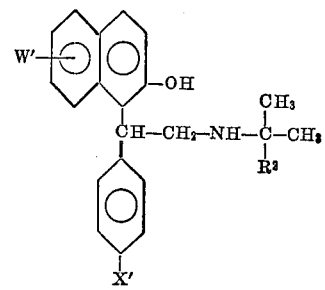

wherein
X' is hydrogen, hydroxy, methoxy or chloro;
W' is hydrogen, chloro, fluoro or hydroxy; and
$R^2$ is hydrogen or methyl, and
the pharmaceutically acceptable nontoxic acid addition salts thereof.

27. A member selected from the group consisting of an amine of the formula:

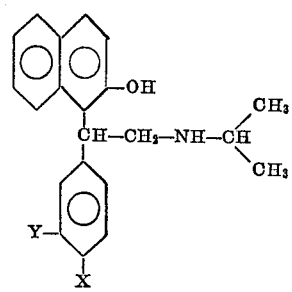

wherein each of X and Y is a member selected from the group consisting of hydrogen, hydroxy, chloro and methoxy, and the pharmaceutically acceptable nontoxic acid addition salts thereof.

(References on following page)

References Cited

UNITED STATES PATENTS
2,308,232   1/1943   Schewing et al. _____ 260—570.6

FOREIGN PATENTS
373,286   4/1923   Germany.

OTHER REFERENCES
Adams et al.: "Journal American Chemical Society," vol. 71, pages 522–6 (1949).

Kappe et al.: "Journal Organic Chemistry," vol. 29, pages 826–29 (1964).

Tanz: "Annual Reports in Medical Chemistry," 1965, Cain. Ed., sec. II, chapter 8B, pages 85–91.

ROBERT V. HINES, Primary Examiner.

U.S. Cl. X.R.

260—343.6, 473, 479, 482, 501.18, 501.19, 519, 559, 566, 570.6, 592, 620, 694; 424—330

PO-1050
(5/69)

UNITED STATES PATENT OFFICE
CERTIFICATE OF CORRECTION

Patent No. 3,452,094      Dated June 24, 1969

Inventor(s) Ralph D. Tanz

It is certified that error appears in the above-identified patent and that said Letters Patent are hereby corrected as shown below:

Col. 1, line 18, "hydroxyethyl" should be -- hydroxyphenyl --

Col. 1, line 20, "chloric' should be -- chloride --

Col. 1, line 67, "os" should be -- as --

Col. 5, line 2, "hydroxyl" should be -- hydroxy --

Col. 5, line 33, "subected" should be -- subjected --

Col. 7, line 31, "hydroxynaphethyl" should be -- hydroxynaphthyl --

Col. 7, line 34, "hydroxynaphethyl" should be -- hydroxynaphthyl --

Col. 8, line 35, "power" should be -- powder --

Col. 8, line 46, "naphethyl" should be -- naphthyl --

Col. 9, line 9, "thoxyoxyacetophenone" should be -- thoxyacetophenone --

Col. 10, line 2, "wasted" should be -- washed --

Col. 10, line 46 should read -- butyl 2-(2-hydroxy-1-naphthyl)-2-(4-hydroxyphenyl)acet- --

Col. 12, line 63, "ox" should be -- oxo --

Col. 13, line 9, "naphtyl" should be -- naphthyl --

Col. 15, line 63, "hydroxyl" should be -- hydroxy --

SIGNED AND
SEALED
MAR 24 1970

(SEAL)
Attest:

Edward M. Fletcher, Jr.
Attesting Officer

WILLIAM E. SCHUYLER, JR.
Commissioner of Patents